(12) United States Patent
Nelson et al.

(10) Patent No.: US 7,251,316 B2
(45) Date of Patent: Jul. 31, 2007

(54) METHODS AND SYSTEMS FOR ENABLING CONVERSATIONS ABOUT TASK-CENTRIC PHYSICAL OBJECTS

(75) Inventors: Lester D. Nelson, Santa Clara, CA (US); Elizabeth F. Churchill, San Francisco, CA (US); Tomas Sokoler, Roskilde (DK)

(73) Assignee: Fuji Xerox Co., Ltd., Tokyo (JP)

( * ) Notice: Subject to any disclaimer, the term of this patent is extended or adjusted under 35 U.S.C. 154(b) by 717 days.

(21) Appl. No.: 10/121,309

(22) Filed: Apr. 11, 2002

(65) Prior Publication Data
US 2003/0194062 A1 Oct. 16, 2003

(51) Int. Cl.
*H04M 11/00* (2006.01)

(52) U.S. Cl. ..................... 379/93.12; 705/37

(58) Field of Classification Search ............... 379/67.1, 379/93.12, 114.13, 88.13, 88.24, 68, 76; 725/42; 705/37; 434/308; 235/462.13
See application file for complete search history.

(56) References Cited

U.S. PATENT DOCUMENTS

| | | | |
|---|---|---|---|
| 5,903,869 A * | 5/1999 | Jacobson et al. ........... 704/272 |
| 6,008,727 A | 12/1999 | Want et al. ............... 340/572.1 |
| 6,088,435 A * | 7/2000 | Barber et al. .......... 379/205.01 |
| 6,192,050 B1 * | 2/2001 | Stovall ........................ 370/389 |
| 6,233,318 B1 * | 5/2001 | Picard et al. ............ 379/88.17 |
| 6,621,899 B2 * | 9/2003 | Dezonno et al. ........ 379/265.09 |
| 6,690,912 B1 * | 2/2004 | Vaughn ....................... 434/308 |
| 6,732,151 B1 * | 5/2004 | Tobias et al. ................ 709/206 |
| 2002/0023959 A1 * | 2/2002 | Miller et al. ........... 235/462.13 |
| 2002/0027567 A1 * | 3/2002 | Niamir ........................ 345/738 |
| 2002/0029187 A1 * | 3/2002 | Meehan et al. ................ 705/37 |
| 2007/0040891 A1 * | 2/2007 | Calloway .................. 348/14.01 |

FOREIGN PATENT DOCUMENTS

WO   WO 94/15294   * 7/1994

OTHER PUBLICATIONS

Arai, T., Aust D., Hudson, S.E., PaperLink: "A technique for hyperlinking from real paper to electronic content" Conference Proceedings On Human Factors in Computing Systems, pp. 327-334, 1997.
Churchill, E.F., Trevor, J., Bly, S., Nelson, L. and Cubranic, D., "Anchored conversations: Chatting in the context of a document" Proc. CHI 2000, 454-461.

(Continued)

*Primary Examiner*—Creighton Smith
*Assistant Examiner*—Olisa Anwah
(74) *Attorney, Agent, or Firm*—Fliesler Meyer LLP (57) ABSTRACT

Methods and systems for enabling discussions among people about physical objects are provided. Each physical object, of a plurality of physical objects, is associated with a unique corresponding identifier and with at least one person interested in the physical object. When an input including a unique identifier is received that input identifies one of the plurality of physical objects as a specific physical object of interest. A conversational element about the specific physical object of interest is eventually captured. This conversational element is likely produced by a person located at or near the specific physical object of interest. At this point at least one person interested in the specific physical object of interest is identified. This can be based on associations that were produced and the input received. The conversational element about the specific physical object of interest can then be provided to the at least one person interested in the specific physical object of interest.

32 Claims, 7 Drawing Sheets

OTHER PUBLICATIONS

Heiner, J.M., Hudson, S.E., and Tanaka, K., "Linking and messaging from real paper in the Paper PDA" Proceedings of the 12th annual ACM symposium on User interface software and technology, pp. 179-186, 1999.

Ishii, H. & Ullmer, B., "Tangible Bits: Towards Seamless Interfaces between People, BIts and Atoms" In the proceedings of CHI'97, 1997.

Ljungstrand, P., Redstrom, J., Holmquist, L., "Webstickers: Using Physical Tokens to Access, Manage and Share Bookmarks to the Web" Proceedings of DARE 2000 (Designing Augmented Reality Environments), 2000.

http://siio.ele.eng.tamagawa.ac.jp/projects/iconsticker/index.html (7 pages).

* cited by examiner

METHODS AND SYSTEMS FOR ENABLING CONVERSATIONS ABOUT TASK-CENTRIC PHYSICAL OBJECTS

BACKGROUND OF THE INVENTION

1. Field of the Invention

The present invention relates to methods and systems for enabling conversations among people about task-centric physical objects.

2. Description of the Related Art

Many systems support synchronous and asynchronous communications between non-collocated individuals. Examples are telecommunication devices with voicemail/voice messaging and computer mediated communication such as text and audio chat with email and file sharing.

Figure 1:
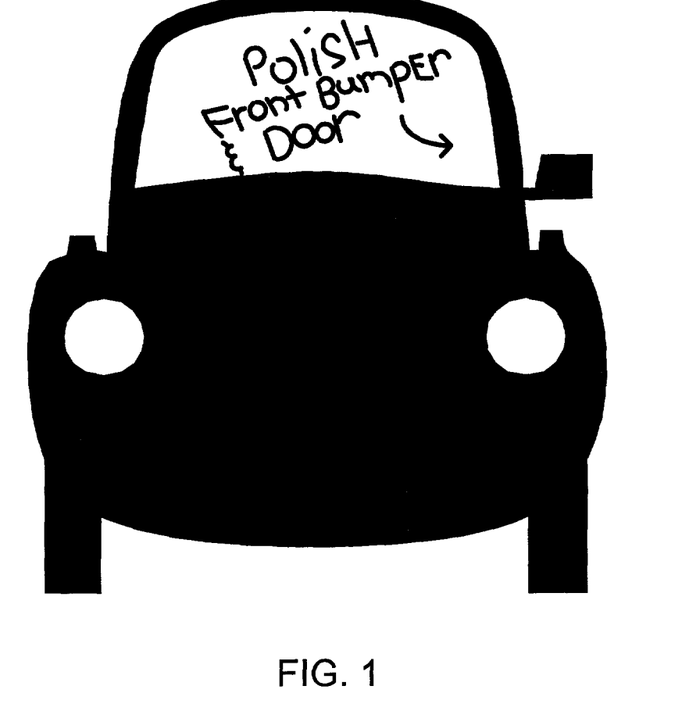
FIG. 1 illustrates a car with repair instructions written on its windshield.

However, a common problem with most communication tools is that conversations tend to be separated from, and have no connection or relationship to, the shared artifacts (i.e. physical object) of interest being discussed. A somewhat unusual linkage between conversation and artifact is illustrated in FIG. 1. This shows a work situation in which a car is being repaired and a wax marker is used to communicate the next steps in the repair procedure for the car. The object of the discussion (i.e., the car) is being used to communication information about itself asynchronously.

In general, this object-conversation separation is a problem for certain kinds of collaborations, namely, those characterized as "tightly" coupled. Tightly coupled collaborations often involve problem solving with others through conversations over shared artifacts (e.g. documents, tools, work products, shared resources, etc). Such "object laden" conversations depend on shared context, i.e. that collaborators have visual access to the artifact or representation to that artifact (i.e., picture, description), either all at once or each at separate times. At the other end of the continuum, loosely coupled collaborations often involve elaborative conversations. Elaborative conversations are relatively independent of the material world and include instances of narration, argument and application.

Evidence suggests that elaborative conversations are easy to achieve, but that object-laden conversations are not. For example, interviews with collaborators who use virtual environments suggest that in chat spaces users will paste text into the shared chat window or find some other means for sharing the specific content over which they wish to converse. However, such pasting can have the side-effect of taking the pasted-in material out of its context. In collaborative virtual environments (CVE), people and artifacts are represented as avatars and shared objects, each requiring work to construct and maintain. Objects in CVEs can be hyperlinked, thereby facilitating discussion about objects in context to other settings. In voice conversation, descriptions maybe constructed on the fly through deictic references, explanation, or props (e.g., a picture of the physical objects, statements like "the red car in the back of the lot next to the silver sedan we just brought in", and formally kept descriptive maintenance logs). In video teleconferencing content sharing must be prearranged (e.g., putting documentation in repositories, bringing objects to discuss to the conferencing center).

There is a need for methods and systems that provide more effective and efficient object-laden conversations between people that are not collocated. Further, there is a need for methods and systems that enable improved communications about physical objects of interest that are not regarded as communication devices themselves.

BRIEF SUMMARY OF THE INVENTION

The present invention is directed to systems and methods for enabling discussions among people about physical objects. Embodiments of the present invention can be used to facilitate the creation of informal social and technical networks around physical objects of interest. In other words, the present invention can be used to create ad hoc communities that form around physical objects. A physical object can be, for example, a document, a piece of art, a car, or a shared resource, such as a complex piece of equipment (e.g., a photocopier).

In accordance with an embodiment of the present invention, each physical object, of a plurality of physical objects, is associated with a unique corresponding identifier and, possibly, also with at least one person interested in the physical object. An input is received that includes a unique identifier that identifies one of the plurality of physical objects as a specific physical object of interest. At this point, a conversational element about the specific physical object of interest is captured. This conversational element can be produced by a person located at or near the specific physical object of interest. At least one person interested in the specific physical object of interest is identified. This can be based on associations (mentioned above) and the input that was received. Finally, the conversational element about the specific physical object of interest is provided to the at least one person interested in the specific physical object of interest.

The above mentioned conversational element can be an audio message, a video message, a text message, a pictorial message, or combinations thereof. Such messages can be converted to digital packet(s) that can then be transmitted (e.g., via email) to the at least one person interested in the specific physical object of interest.

In addition to capturing conversational elements, ancillary information about the specific physical object of interest can also be captured. This ancillary information can then also be provided to the at least one person interested in the specific physical object of interest. Ancillary information is information that is generated by something other than a person. Ancillary information can be generated, for example, by the physical object of interest, a sensor measuring some aspect of the physical object of interest, and/or a camera capturing pictorial or video images of the physical object of interest. Thus, ancillary information can include information about the physical environment (e.g., temperature) of the physical object, metadata such as date stamps and time stamps, operational information and/or diagnostic data.

In another embodiment of the present invention, in response to receiving the input that identifies one of the physical objects as a specific physical object of interest, real or close to real time communication is established between a person (located at or near the specific physical object of interest) and the at least one person interested in the specific physical object of interest. This communication can be a voice conference, a video conference, or an instant messaging session. Ancillary information can be captured and provided with or during the communication.

BRIEF DESCRIPTION OF THE DRAWINGS/FIGURES

The features, objects, and advantages of the present invention will become more apparent from the detailed description set forth below when taken in conjunction with the drawings in which like reference characters identify the same or similar elements throughout and wherein.

DETAILED DESCRIPTION OF THE INVENTION

In the description herein, the term synchronous communication refers to communication that occurs in real time or almost real time, such as a telephone conversation, an instant messaging conversation, and the like. In contrast, the term asynchronous communication refers to communication that does not occur in real time or almost real time, such as email and other store and forward communication.

An approach of embodiments of the present invention is to centralize conversations through the physical objects of interest by linking physical objects to a communication system. The physical objects of interest here are ones that serve a functional purpose for accomplishing a task (e.g., a tool). Further, these physical objects are not regarded as communication devices themselves (e.g., telephones, networked PDAs). High level task and object-specific protocols for communication centered around those objects are also provided. Discussions are thus held in context to the places, situations, and content of physical environments.

Figure 2A:
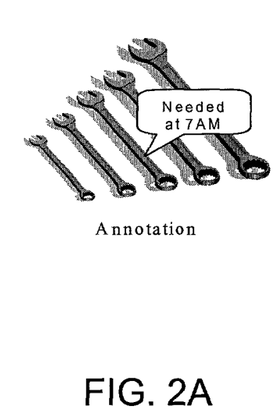
FIGS. 2A, 2B and 2C, respectively, are representative of annotation, history and connection approaches of embodiments of the present invention.
Figure 2B:
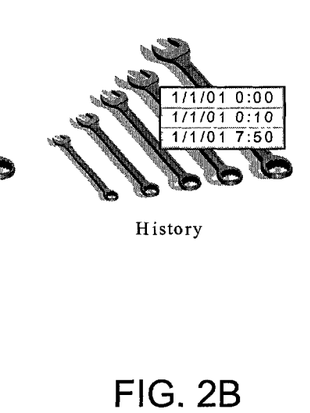
Figure 2C:
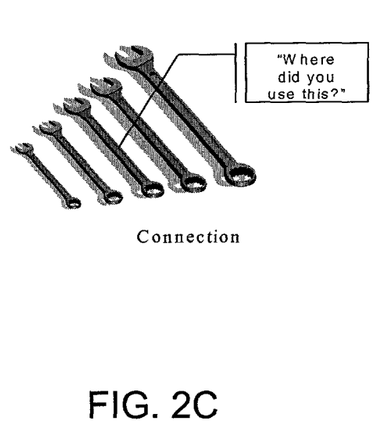

FIGS. 2A, 2B and 2C are used to represent three approaches for addressing this linkage in accordance with embodiments of the present invention. A first approach, represented in FIG. 2A, is annotation. Annotation provides record and playback ability (e.g., sound or text) so that users can annotate a physical object to permit asynchronous conversation in the presence of the physical object. Another approach, represented in FIG. 2B, is history. History is a record relating to the activity of physical objects (e.g., sensor logs) to capture some context for conversations held on the object. A further approach, connection, is represented in FIG. 2C. Such a connection can be, for example, from the physical object to a communication system (e.g., via a transceiver), directly or in combination with other communication devices. As will be appreciated from the following discussion, combinations of annotation, history and connection can be made to facilitate synchronous and/or asynchronous communications that occur either remotely or in the presence of the object.

Figure 3A:
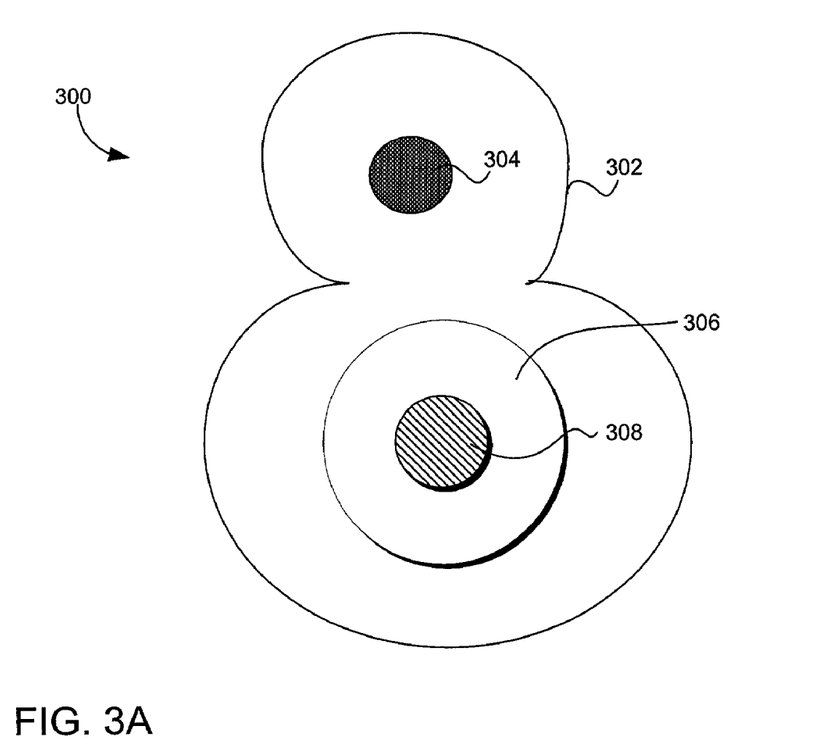
FIGS. 3A and 3B, respectively, illustrate a front view and a side view of an exemplary posting device, in accordance with an embodiment of the present invention.
Figure 3B:
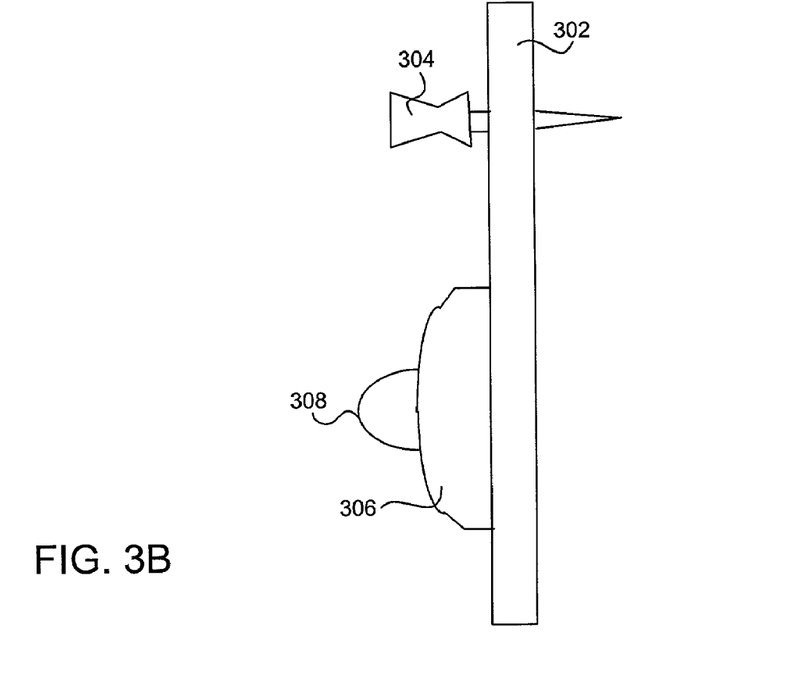
Figure 4:
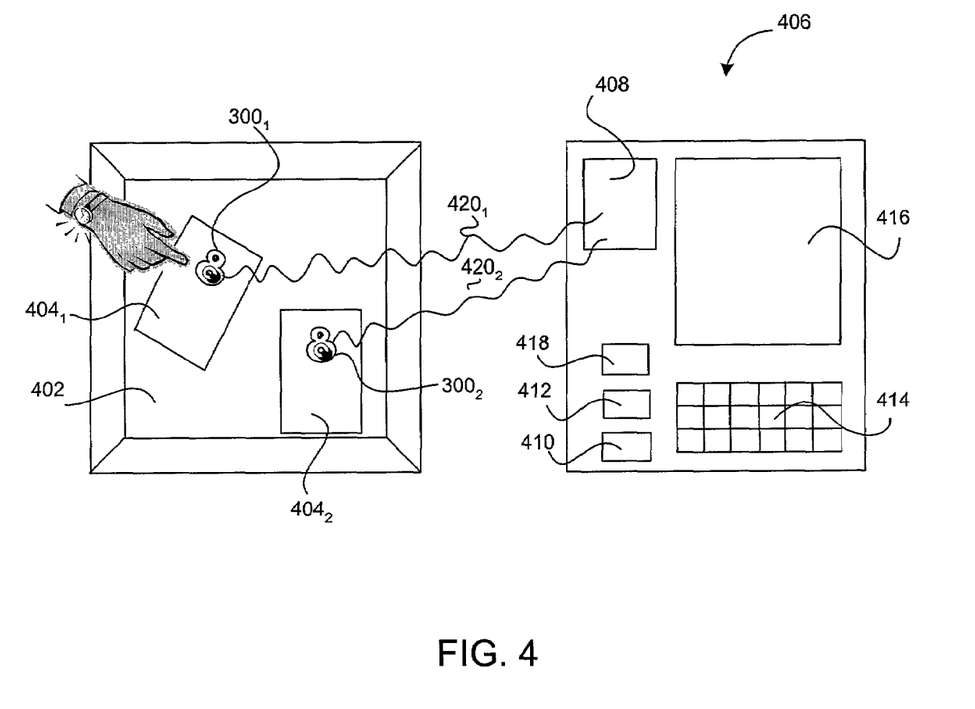
FIG. 4 illustrates components of an exemplary system for enabling conversations among people about physical objects of interest, in accordance with an embodiment of the present invention.

One embodiment of the present invention, referred to as TackTales, shall be used to illustrate the three approaches of annotation, history and connection. Referring to FIG. 3, the TackTales embodiment includes a posting device 300, which can be a push pin that has modified to convey its unique identity upon demand. Referring to FIG. 4, posting devices 300 can be used to post physical documents 404 of interest on a shared, centrally located bulletin board 402. A message about the posting (e.g., who posted it and why) can be left using a button 308 to activate a messaging interface, 406, also referred to as a communications terminal 406. Others can further view, and annotate if desired, through a similar use of the system, to thereby yield an asynchronous messaging capability that annotates the posting object 404 with discussion. The TackTale system also keeps track of the activations (e.g., when, who, where) and thereby permits a history of the interest in the discussion to be built up over time. The system can also be used to send messages to the person that made the initial posting whenever further posting activity occurs.

As can be appreciated from the above discussion, embodiments of the present invention can be used to facilitate the creation of informal social and technical networks around physical objects of interest. In other words, the present invention can be used to create ad hoc communities that form around physical objects. A physical object can be, for example, a document, a piece of art, a car, or a shared resource, such as a complex piece of equipment (e.g., a photocopier). The ad hoc community can include those people who use the complex piece of equipment for an important need and must know how to use and/or fix the equipment. Embodiments of the present invention can also be used to share information about a community event through postings about a particular event in a public place. In another example, embodiments of the present invention can be used to communicate information about the state of a physical environment. More specifically, embodiments of the present invention can be used by people who work together at the same place, but at different times (e.g., a facility shared by different work shifts).

Posting device 300, briefly referred to above, will now be described in more detail with reference to FIGS. 3A and 3B. FIG. 3A shows a front view, and FIG. 3B shows a side view of posting device 300, which in this embodiment is a modified pushpin device. In this exemplary embodiment, posting device 300 includes a support structure 302, a pushpin 304 extending through support structure 302, an identification tag 306 and an activation button 308. Support structure 302, which can be made of plastic, metal, cardstock, and the like, couples pushpin 304 to identification tag 306.

Referring to FIG. 4, posting device 300 can be used to attach physical objects 404 (e.g., paper articles) to bulletin board 402 (e.g., a cork board). Physical objects 404 can be newspaper articles, magazine articles, event postings and other similar documents that were posted by a person (also referred to as "the poster") interested in feedback from other persons. In alternative embodiments, other fixation devices can be used in place of pushpin 304. For example, a magnet can be used if bulleting board 402 is metallic. Alternatively, a staple can be used in place of pushpin 304. In another example, support structure 302 (or identification tog 306 itself) can have an adhesive or sticky back surface that is similar to that of adhesive tape. These are just a few example, which are not meant to be limiting.

Identification tag 306 can transmit (e.g., broadcast) a unique identifier and other optional data at various selected radio frequencies. The identifier (e.g., an alphanumeric code) can be user assigned at electronic tag activation, user modifiable by software command, or fixed by an electronic tag manufacturer, depending on the particular embodiment employed. In certain embodiments, infrared, ultrasonic, or other suitable data transfer systems maybe used alone or in combination with radio frequency tags to transmit unique identifiers or associated data. Identification tag 306 can be inductively powered by external electromagnetic coils, powered by internal batteries, powered by photovoltaic cells, powered by trickle currents from household current when available, or any other suitable power mechanism. Transmission of the identifier and/or data can be continuous, intermittent, in response to external status inquiries, at random intervals, or in response to local powering of identification tag 306. In one embodiment, transmission of the identifier and optional additional data occurs when button 308 is pressed, causing an internal switch to initiate such transmission. Additional details of various embodiments for identification tag 306 (which may also be referred to as an electronic tag) are disclosed in U.S. Pat. No. 6,008,727, which is incorporated herein by reference in its entirety.

Located in close proximity to bulletin board 402 is a communications terminal 406, shown in FIG. 4. Communications terminal 406, which can include a computer system, enables the person posting a physical object 404 (e.g., a document) using posting device 300 to identify themselves and/or information about themselves (e.g., an email address or a telephone number). Communications terminal 406 also enables other persons to participate in a conversation about (i.e., relating to) one of physical objects 404.

Communications terminal 406 can include, for example, a speaker 410, a microphone 412, a keyboard or keypad 414, a camera 418 and a display 416 (which can be a touch screen). Communications terminal 406 can also includes a receive device 408 that receives identification signals 420 from posting devices 300. Physical objects 404, in this example, may include textual and/or pictorial information. However, physical objects 404 are not typical communication devices that enable communications with persons not collocated. Stated another way, physical objects 404 are not telephones, networked personal data assistants (PDAs), or any other similar type electronic wired or wireless communications devices. As will be appreciated from the following discussion, embodiments of the present invention provide a linking of physical objects 404 to a communications system so that conversations about physical objects can occur among people that are not all collocated at or near physical object 404.

In the above example, identification tag 306 is described as a device that transmits a unique identifier. In alternative embodiments, identification tag 306 includes a bar code, Glyph or other symbol that enables optical or visual recognition of a unique identification code. In such embodiments, an interrogating device that is attached to, or in communications with, communications terminal 306 can be used to read the unique identification code. In these embodiments, the input including a unique identifier (that identifies one of the physical objects as a specific object of interest) can be generated by the interrogating device as a result of the interrogating device reading the bar code, Glyph, etc.

In still another embodiment, each identification tag 306 has a unique alphanumeric identifier (consisting of one or more numbers and/or letters) printed on it. The person wanting to enter a message about a specific physical object can then manually enter the identifier using the keypad/keyboard 414 or touch screen 416 of communications terminal 406. This is another example of how an input including a unique identifier (that identifies one of a plurality of physical objects as a specific physical object of interest) can be received.

Using features of the present invention, a first person posts a first physical object $404_1$ on bulletin board 402 using a first posting device $300_1$ (or simply an identification tag 306). The first person then initiates an association of themself with first physical object $404_1$. This can occur when the first person presses button 308, causing an identification signal $420_1$ to be transmitted to receive device 408 of communications terminal 406. If this is anew posting, communications terminal 406 prompts the first person to enter a title or name for first physical object $404_1$. Communications terminal 406 also prompts the first person to enter information about himself/herself. Such information can include, for example, a name, telephone number, email address, instant messaging address and the like. This enables communications terminal 406 to send conversational elements to the first person at a later time. Alternatively or additionally, this enables communications terminal 406 to set up a communications channel or instant messaging session between the first person and other persons at a later time.

Communications terminal 406 (which can include a computer system) or a computer system networked to communications terminal 406, associates a unique corresponding identifier (e.g., provided in identification signal $420_1$) with first physical object $404_1$ (or more specifically, with the title or name of the object provided by the first person). The information about the first person can also be associated with the first physical object $404_1$. Such associations can be accomplished, for example, using an association list or table that is stored in memory of communications terminal 406 or a computer system networked to communications terminal 406.

Also shown in FIG. 4 is a second physical object $404_2$ that a second person posted on bulletin board 402 using a second posting device $300_2$. Second posting device $300_2$ is associated with its own unique identifier that can be transmitted via a second identification signal $420_2$. Similar association information is produced for second physical object $404_2$. Thus, each physical object, of a plurality of physical objects (e.g., objects $404_1$ and $404_2$), is associated with a unique corresponding identifier with at least one person interested in the physical object (e.g., the posting person), in accordance with an embodiment of the present invention.

Bulletin board 402 is preferably located in a place that is frequently visited by other people. In this manner, embodiments of the present invention can be used to spawn conversations about physical objects (e.g., document postings). For example, if a third person observes first physical object $404_1$ and wants to comment or remark about the object, that third person can press button 308 of posting device $300_1$ supporting that object $404_1$. Upon pressing button 308, identification signal $420_1$ is transmitted to receive device 408 of communications terminal 406. Communications terminal 406 (or more specifically the computer system within or network to the communications terminal) will recognize the unique identifier communicated by identification signal $420_1$ and prompt the third person to communicate in anyone of a number of different manners. In one embodiment, communications terminal 406 prompts the third person to enter a text or other visual message relating to the physical object of interest $404_1$. The message can be entered using keyboard/keypad 414 and/or touch screen 416. In an alternative embodiment, communications terminal 406 can prompt the third person to record a voice message using microphone 412. Such text or voice messages are examples of conversational elements that can be captured by communications terminal 406. A conversational element can also be a video message recorded using camera 418. Such conversational elements, also referred to herein as annotations, are stored in memory associated with the computer system.

Based on the unique identifier, communications terminal 406 can identify at least one person (other than the third person) interested in first physical object $404_1$ (i.e., the specific physical object of interest to the third person). The first person that posted first physical object $404_1$ is an example of a person interested in first physical object $404_1$. Other persons having interest in first physical object $404_1$ could have been identified by the first person when he/she posted the physical object. This can be accomplished in any number of other different ways, some of which are discussed below.

The captured conversational element about first physical object $404_1$ can then be provided to the at least one person (e.g., the first person) interested in first physical object $404_1$. This can be accomplished by sending a text or other visual message via email to the at least one person. If the conversational element is a voice message, the voice message can be converted to one or more digital packets that can be sent as an email using any of the various techniques known in the art. If the conversation element is video, it could be captured as or converted to digital media packets and sent as an email. A captured conversational element can be provided to the one or more persons interested in the physical object immediately or relatively soon after the conversational element is captured. Alternatively, many captured conversational elements can be accumulated before they are provided to the one or more persons interested in the physical object. As mentioned above, captured conversational elements can be provided to the one or more persons interested in the physical object by sending these conversational elements via email. Captured conversational elements can also be posted on a web site that can be accesses by the one or more persons interested in the physical object. In yet another embodiment, the captured conversational elements can be accessed at communications terminal 406 when the one or more persons interested in the physical object visit the terminal.

In addition to prompting the third person to enter a message (e.g., text or voice), communications terminal 406 can also prompt the third person to enter information about himself/herself, such as their name, email address, instant messaging address, telephone number and the like. Communications terminal 406 can then ask the third person whether they want to be notified of further messages provided by further people) about first physical object $404_1$. If the third person answers affirmatively, then the third person can be added to the set of persons interested in first physical object $404_1$. This can be accomplished, for example, by adding information about the third person into the association list or table that is stored in memory of communications terminal 406 or a computer system networked to communications terminal 406. Accordingly, the at least one person interested in first physical object $404_1$ may now include the first person and the third person.

In the above described example, there is one communications terminal 406 for multiple physical objects (e.g., physical objects $404_1$ and $404_2$). Communications terminal 406 can be located in close proximity to the physical objects to thereby enable conversations about the physical objects. In another embodiment, communications terminal 406 can be portable such that a person can carry the terminal with them. Thus, each person may have their own communications terminal 406. Then, when a person carrying a terminal 406 comes across a physical object of interest to them, they can either begin a conversation about the physical object or add to an ongoing conversation about the physical object.

The person may themselves attach an identification tag 306 to (or near) the physical object if one is not already attached. The personal communications terminal 406 can then be used to associate the physical object with a unique identifier and with themselves. Further people can use their own communications terminals 406 to produce conversational elements about the physical object. The conversational elements can then be forwarded to a central communications terminal that can store (e.g., in memory) and forward the conversational elements to other people interested in the object.

In the above example, posting devices 300 are used to link physical objects to a communications system. Posting devices 300 were described as devices that can attach a physical document a bulletin board. However, various other embodiment for enabling conversations among people about physical objects are contemplated by the inventors. In one embodiment, identification tags 306 are attached to any physical object about which a person wants to have a conversation. For example, identification tags 306 can be attached directly to (or placed next to) pieces of art in a gallery. This will enable discussions among multiple people about specific pieces of art, even though these people are not all viewing the art at the same time. In another embodiment, identification tags 306 are placed on cars in a showroom or on a car lot. This may enable people to ask questions about specific cars or to make offers to purchase the cars. This may also enable people to obtain information about cars they may want to purchase. In further examples, identification tags 306 are placed on machinery within a factory or pipes within a waste management plant. This enables maintenance personnel on different work shifts to collectively trouble shoot machinery that is in need of repairs or upgrades.

An advantage of the present invention is that identification information about physical objects do not need to be constantly recreated. This is because physical objects are associated with unique identifiers that, when received by communications terminal 406, identify the physical object and identify person(s) that are interested in that object. Additionally, when conversational elements about a physical object are provided to people (e.g., via email), an identity of the physical object can automatically be provided with the conversational element (e.g., in a subject line). Thus, there is no need for every person participating in a conversation about, for example, a piece of art, to specify that they are referring to the large sculpture, in the front room, on the third floor of the green gallery. Further, embodiments of the present invention provide easy and convenient techniques for non-collocated people to discuss physical objects that are if interest to them.

In addition to providing conversational elements about physical objects, embodiments of the present invention can also be used to provide ancillary information about physical objects. Ancillary information, as used herein, is defined as information that is generated by something other than a person. In other words, ancillary information does not include conversational elements generated by people. Rather, ancillary information maybe generated, for example, by the physical object of interest, a sensor measuring some aspect of the physical object of interest, and/or a camera capturing pictorial or video images of the physical object of interest. Thus, ancillary information can include information about the physical environment (e.g., temperature) of the physical object. Ancillary information can also be metadata such as date stamps and time stamps. Ancillary information can also include operational information if, for example, the physical object is a piece of machinery. Ancillary information can also be diagnostic data. These are just a few examples of ancillary information. One of ordinary skill in the art will appreciate that other types of ancillary information are within the spirit and scope of the present invention.

Figure 5:
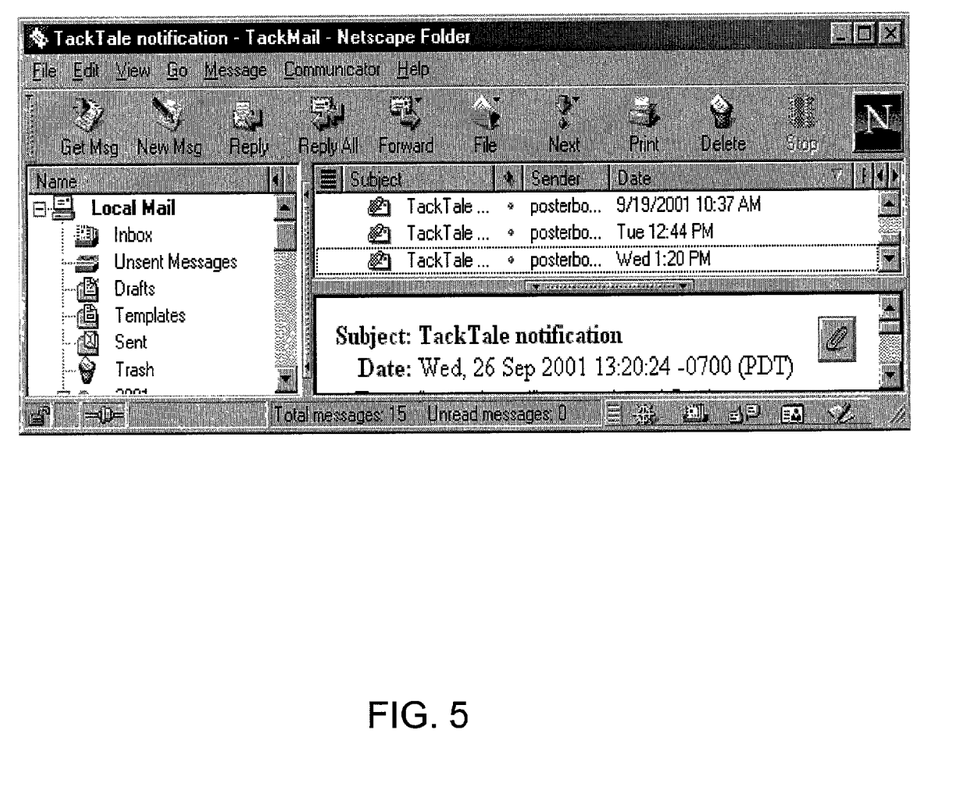
FIG. 5 illustrates an exemplary web page that shows a history in accordance with an embodiment of the present invention.

In accordance with an embodiment of the present invention, ancillary information is associated with conversational elements. Then, when a person interested in a physical object is provided with conversational elements about the physical object, they can also be provided with corresponding ancillary information. Thus, the person can be provided with date and time information specifying when a message was recorded. Additionally, the person can be provided with diagnostic, operation and/or environmental condition information relating to when a specific message was recorded. Ancillary information, such as date and time stamps, can be used to generate a history of a conversation about a physical object. Such a history, which is a log of conversational elements and associated ancillary information, can be presented to a person on display 416 of communications terminal 406. Alternatively, or additionally, a history can be accessed via a web page, as shown in FIG. 5.

Instead of, or in addition to, supporting asynchronous (i.e., not real time) communications about a physical object 404, in the manners discussed above, synchronous (i.e., real or close to real time) communications can be supported between the third person located at or near physical object 404 and the at least one person interested in the physical object 404. For example, in response to receiving a signal 420$_1$ identifying first object 404$_1$ as a specific physical object of interest, communications terminal 406 can establish communication between the third person (located at or near first physical object 404$_1$) and the at least one person interested in first physical object 404$_1$ (e.g., the first person that posted first physical object 404$_1$). In a more specific example, communications terminal 406 can automatically dial the phone number of the first person in response to receiving signal 420$_1$. A voice conversation or conference can then be supported using microphone 410 and speaker 412 (or a telephone style handset, not shown). In another example, communications terminal 406 can send an instant message (entered by the third person) to the first person and thereby initiate and support an instant messaging session between the third person and the first person. In still another example, communications terminal 406 can also support a video conference using camera 418, microphone 410 and speaker 412.

Ancillary information can also be generated for synchronous communications. Further, histories can be created for synchronous communications. Thus, even though the synchronous communications enable conversations that occur in real or close to real time, these conversations can also be stored and then replayed at a later time.

Various types of networks and protocols can be used to support the communications of the present invention. For example, the computer system associated with communications terminal 406 can include portions of the H.323 protocol stack to provide the foundation for data communications across an internet protocol (IP) network. The H.323 protocol stack can include, for example, real time protocol/real-time control protocol (RTP/RTCP), transport control protocol (TCP), etc. Communications terminal 406 can include audio codecs (e.g., G.711, G.723.1, G.729, etc.), and/or video codecs (e.g., H.261 and H.263) for use in capturing audio and/or video conversational elements. Codecs can also be used to provide real or close to real time communications between parties. Protocols such as Q.931 can be used to manage call setup and termination. Protocols such as H.245 can be used to negotiate channel usage and capabilities and to transport transfer of dual tone multifrequency (DTMF) digits. Media streams can be transported using RTP/RTCP. RTP can be used to carry the actual media and RTCP can be used to carry status and control information. Signaling can be transported reliably using transport control protocol (TCP). These are just a few examples of protocols that can be used to assist in implementing embodiments of the present invention, and is in no way meant to be limiting.

Figure 6:
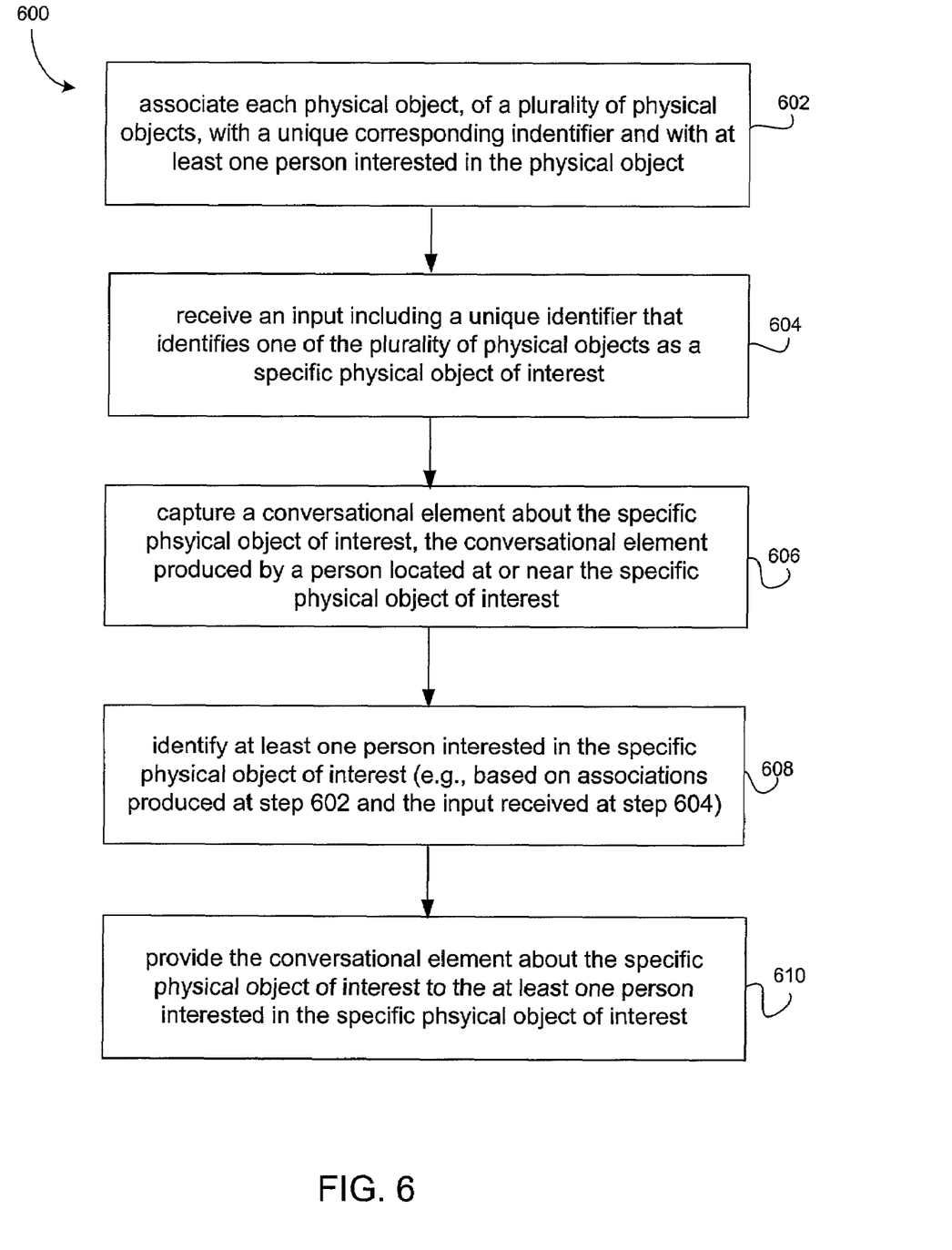
FIGS. 6 and 7 are flow diagrams that are used to summarize methods of the present invention.

Features of the present invention will now be summarized with reference to flow diagrams. FIG. 6 is a flow diagram that is useful for explaining a method 600 for enabling discussions among people about physical objects. Method 600 relates to the asynchronous embodiments of the present invention.

Beginning at step 602, each physical object, of a plurality of physical objects (e.g., 400$_1$ and 400$_2$, shown in FIG. 4), is associated with a unique corresponding identifier. Additionally, each physical object can be associated with at least one person interested in the physical object. Such associations can be stored in a table, as mentioned above. But more generally, such associations can be stored in any type of association list including, but not limited to, a table, an array or a matrix.

At a step 604, a unique identifier, that identifies one of the plurality of objects as a specific physical object of interest, is received. As mentioned above, the unique identifier can be embedded in a signal received from an identification tag 306 or can be read using a bar code reader or some other type of sensing device. The unique identifier may alternatively be manually entered into communicational terminal 406.

At a step 606, a conversational element about the specific physical object of interest is captured. The conversational element is most likely produced by a person located at or near the specific physical object of interest. As described in detail above, the conversational element is captured by communications terminal 406. Various conversational elements, including but not limited to audio (e.g., voice), text and video, are discussed above. At this point, ancillary information (e.g., date stamps, time stamps, environmental information, etc.) can also be captured. The ancillary information can then be used to put conversational elements about the physical object of interest into context so that another person obtaining (e.g., listening to or observing) conversational elements has a better understanding of the circumstances existing when the conversational elements were captured.

At a step 608, at least one person interested in the specific physical object of interest is identified. This can be based, for example, on the associations produced at step 602 and the input received at step 604. The at least one person interested in the specific physical object of interest most likely includes the person that began the conversation about the object. Referring to the example of FIG. 4, this can be the person that posted the physical object (e.g., 404$_1$ or 404$_2$) on bulletin board 402. The posting person can also specify additional people that are interested in the physical object. This can be accomplished by manually entering information using communications terminal 406 or by using a drag and drop feature of communications terminal 406 that enables the specifying of interested people by touching pictures of the people presented on touch screen 416. People who add conversational elements about the specific physical object can also be added to the set making up the at least one person interested in the specific object of interest. These are just a few example of how additional people can be identified as those interested in a specific physical object.

Finally, at a step 610, the conversational element(s) about the specific object of interest is/are provided to the at least one person (i.e., one or more persons) interested in the specific physical object of interest. As discussed above, this can be accomplished using email, postings on a web site, or allowing for the retrieval of the conversational elements at communications terminal 406. These are just a few examples of how the conversational elements can be provided to the one or more persons interested in the physical object of interest.

Figure 7:
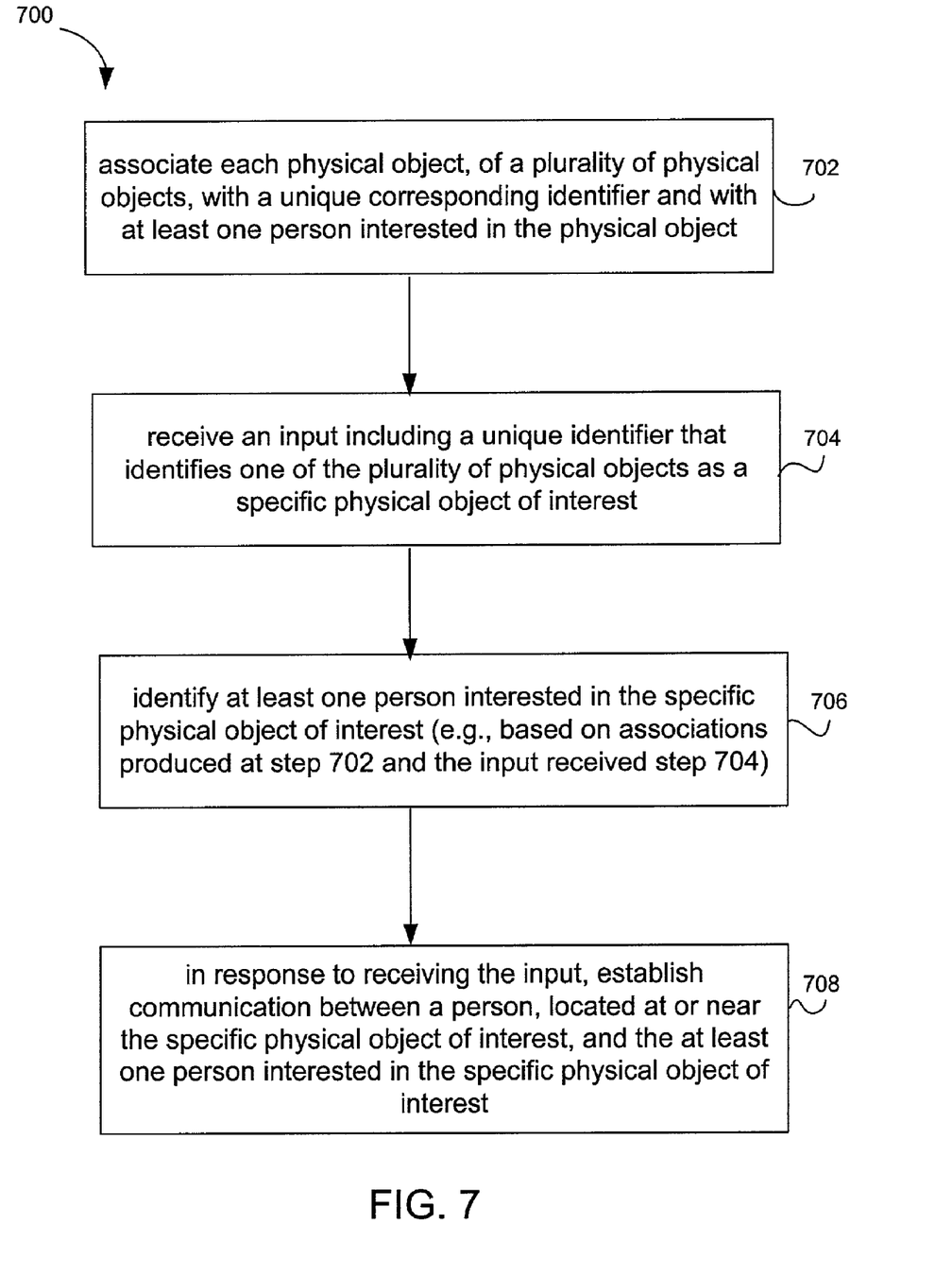

The flow diagram of FIG. 7 will now be used to explain alternative embodiments of the present invention. More specifically, method 700 of FIG. 7 relates to the synchronous embodiments of the present invention. At a step 702, each physical object of a plurality of physical objects is associated with a unique corresponding identifier and possibly also with at least one person interested in the physical object of interest. At a step 704, an input is received that identifies one of the plurality of physical objects as a specific physical object of interest. At a step 706, at least one person interested in the specific physical object of interest is identified. As can be appreciated from a comparison between FIG. 6 and FIG. 7, steps 702, 704 and 706 are essentially the same, respectively, as steps 602, 604 and 608. Thus, additional details of these steps are not repeated.

At a step 708, in response to receiving the input (received at step 704), communication is established between a person, located at or near the specific physical object of interest, and the at least one person interested in the specific object of interest. As discussed above, communications terminal 406 can, for example, automatically dial the phone number(s) of the at least one person interested in the specific physical object of interest. Then a voice conversation can be supported using microphone 410 and speaker 412 (or a telephone style handset, not shown). Alternatively, communications terminal 406 can send an instant message(s) to the at least one person interested in the specific physical object of interest. In still another embodiment, communications terminal 406 can support a video conference using camera 418, microphone 410 and speaker 412. These are just a few examples of the real or close to real time communications that can occur between the person located at or near the specific physical object of interest and one or more other persons interested in that object. Ancillary information can also be generated and histories can be created. The ancillary information can be provided to the non collocated person(s) involved in the conversation about the physical object. Additionally, ancillary information and the conversation can be stored and replayed at a later point in time.

It would be apparent to one of ordinary skill in the relevant art that some of the steps of methods 600 and 700 discussed with reference to FIGS. 6 and 7 need not be performed in the exact order described. However, it would also be apparent to one of ordinary skill in the relevant art that some of the steps should be performed before others. This is because certain steps use the results of other steps. The point is, the order of the steps is only important where a step uses results of another step. Accordingly, one of ordinary skill in the relevant art would appreciate that embodiments of the present invention should not be limited to the exact orders shown in FIGS. 6 and 7. Additionally, one of ordinary skill in the relevant art would appreciate that embodiments of the present invention can be implemented using subgroups of the steps that are shown in FIGS. 6 and 7.

Each physical object can consist of a group or subset of physical objects, for example, a few related (or even unrelated) documents. Thus, associating a physical object with at least one person interested in the physical object can be interpreted as collectively associating three documents with at least one person interested in the three documents. In other words, referring back to the examples of FIGS. 3 and 4, a single posting device 300 can be used to attach the three documents to bulletin board 402 (e.g., pushpin 304 can be pushed through all three documents). A unique identifier (e.g., transmitted by an identification tag 306) may then identify a group or subset of physical objects, such as the three documents. Accordingly, a "specific physical object of interest" can actually be three documents (or paintings, etc.) of interest. Continuing with this logic, steps 602 and 702 can be interpreted as associating each subset of physical objects, of a plurality of physical objects, with a unique identifier and with at least one person interested in the subset. Similarly, specific ancillary information may be related to a subset of physical objects. Each subset can consist of one or more physical objects, of the plurality of physical objects. It is even possible that one subset overlaps another subset.

Features of the present invention can be performed by communications terminal 406 and its associated computer system. Accordingly, communications terminal 406 and its associated computer system are also referred to collectively as a system of the present invention. Additional details of an exemplary computer system are discussed below with reference to FIG. 8.

As described above, the system of the present invention includes an association list to associate each physical object, of a plurality of physical objects, with a corresponding unique identifier. The association list can be in table, array, matrix or any other appropriate configuration. The association list can also associate at least one person with each of the plurality of physical objects. This enables one or more persons interested in each physical object to be identified.

The system of the present invention also includes a receive subsystem to receive an input including a unique identifier that identifies one of the plurality of physical object as a specific physical object of interest. This receive subsystem can be receive device 408, discussed above with reference to FIG. 4, which can receive identification signals 420 from identification tags 306. This receive subsystem can also be keyboard/keypad 414, which accepts manual entry of unique identifiers. In another embodiment, the receive subsystem is touchscreen 416, which allows a person to specify a physical object as the specific physical object of interest by a touch, a drag and drop, or any other similar interaction. The receive subsystem can also be a bar code or Glyph reading device that provides a signal representative of a unique identifier to communications terminal 406. The receive subsystem can even be microphone 412 together with voice recognition software that enables a person to input a unique identifier vocally.

According to an embodiment of the present invention, the system of the present invention also includes a capture subsystem to capture conversational elements about physical objects of interest. The capture subsystem can be, for example, microphone 412, keyboard/keypad 414, camera 418 and/or touchscreen 416, as discussed above. The capture subsystem can also include appropriate storage (e.g., memory) to store the conversational elements. Additionally, the capture subsystem can also capture ancillary information about physical objects.

The system of the present invention should also be able to identify at least one person interested in an identified physical object. This function can be performed by a processor, as would be apparent to one or skill in the art. The processor can use the associations stored in the association list and the input received by the input subsystem to identify at least one person interested in the specific physical object of interest.

The system in accordance with an embodiment of the present invention also includes a communications subsystem to provide conversational elements (about a specific physical object of interest) to the one or more persons interested in the specific physical object of interest. This communications subsystem can include, for example, the hardware and/or software to forward conversational elements over communications networks (e.g., voice and/or data networks). The communications subsystem, in accordance with another embodiment of the present invention, includes the hardware and/or software to establish communication (e.g., a communications channel) between multiple parties in response to receiving a unique identifier. The communications system may also provide captured ancillary information about a physical object to the one or more persons interested in the physical object.

Each of the above subsystems can be implemented using existing technology known in the relevant art. Accordingly, a more detailed description of these subsystems shall not be provided. However, for completeness, the following description of an exemplary general purpose computer system 800 is provided with reference to FIG. 8.

Figure 8:
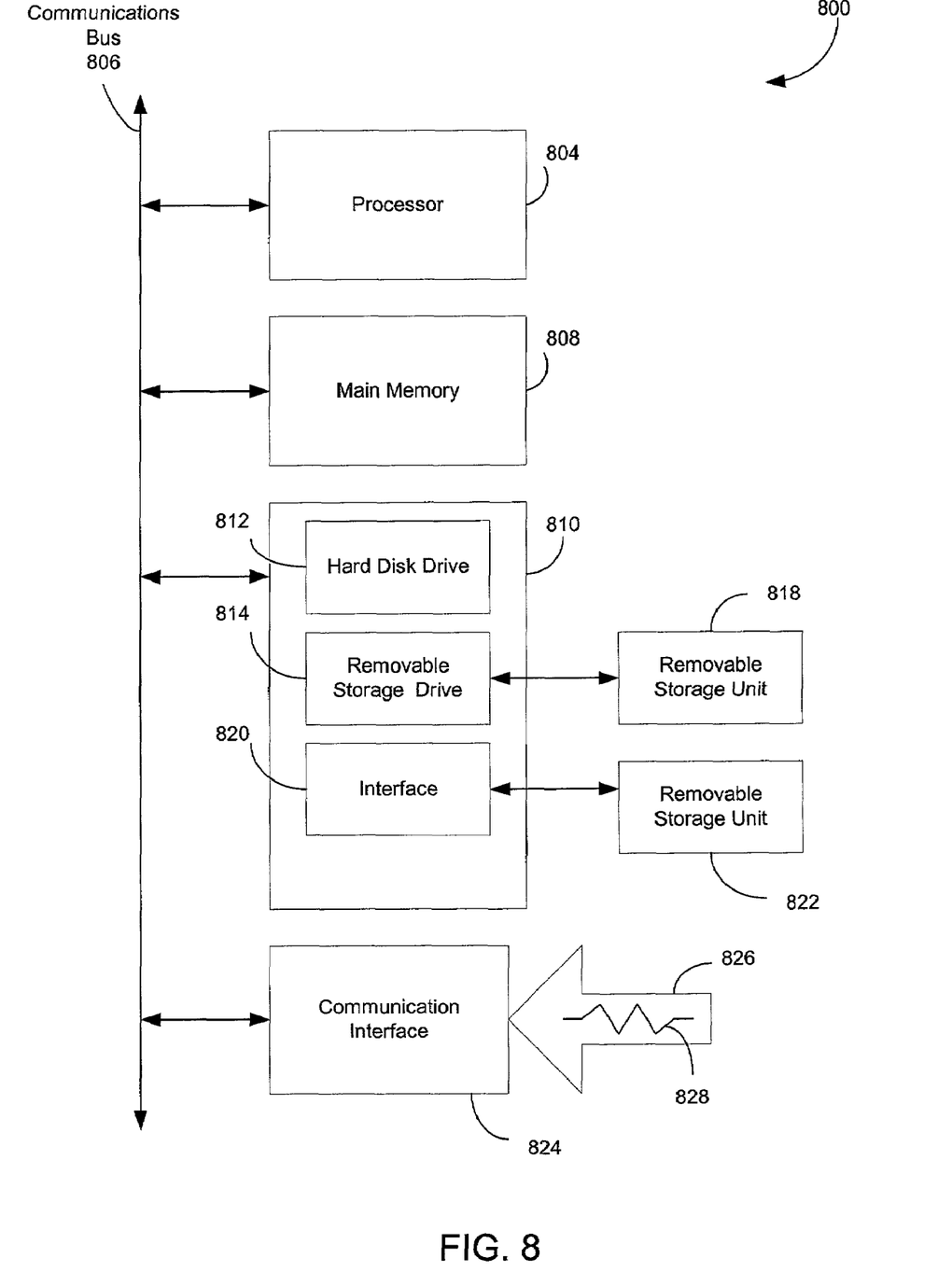
FIG. 8 is a functional block diagram of a computer system useful for implementing features of the present invention.

Referring to FIG. 8, example computer/processing system 800 includes one or more processors, such as processor 804. Processor 804 is connected to a communication infrastructure 806 (for example, a bus or network). Various software implementations are described in terms of this exemplary computer system. After reading this description, it will become apparent to a person skilled in the relevant art how to implement the invention using other computer systems and/or computer architectures.

Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a compact disk drive, a magnetic tape drive, an optical disk drive, etc. The removable storage drive 814 reads from and/or writes to a removable storage unit 818 in a well known manner. Removable storage unit 818, represents a floppy disk, a compact disk, magnetic tape, optical disk, etc. which is read by and written to by removable storage drive 814. As will be appreciated, the removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCM-CIA slot and card, etc. Software and data transferred via communications interface 824 are in the form of signals 828 which maybe electronic, electromagnetic, optical or other signals capable of being received by communications interface 824. These signals 828 are provided to communications interface 824 via a communications path 826. Communications path 826 carries signals 828 and may be implemented using wire or cable, fiber optics, a phone line, a cellular phone link, an RF link and other communications channels.

In this document, the terms "computer program medium" and "computer usable medium" are used to generally refer to media such as removable storage drive 814, a hard disk installed in hard disk drive 812, and signals 828. These computer program products are means for providing software to computer system 800.

Computer programs (also called computer control logic) are stored in main memory 808, secondary memory 810, and/or removable storage units 818, 822. Computer programs may also be received via communications interface 824. Such computer programs, when executed, enable computer system 800 to implement the present invention as discussed herein. In particular, the computer programs, when executed, enable the processor 804 to implement the features of the present invention. Where the invention is implemented using software, the software maybe stored in a computer program product and loaded into computer system 800 using removable storage drive 814, hard drive 812 or communications interface 824.

Features of the invention may also be implemented primarily in hardware using, for example, hardware components such as application specific integrated circuits (ASICs). Implementation of the hardware state machine so as to perform the functions described herein will be apparent to persons skilled in the relevant art(s). Features of the present invention can also be implemented primarily using software. In yet another embodiment, features of the invention can be implemented using a combination of both hardware and software.

While various embodiments of the present invention have been described above, it should be understood that they have been presented byway of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

The breadth and scope of the present invention should not be limited by any of the above-described exemplary embodiments, but should be defined only in accordance with the following claims and their equivalents.

What is claimed is:

1. A communication system, comprising:
   a posting device that has a corresponding unique identifier; and
   a communications terminal that receives the unique identifier from the posting device;

wherein the posting device includes
　　a fixation portion configured to physically couple the posting device with a physical object; and
wherein the communications terminal includes
　　a storing section that stores association information associating the unique identifier with the physical object, and with a plurality of user addresses relating to the physical object;
　　a receive subsystem that receives the unique identifier from the posting device when a user accesses the posting device;
　　a control section that identifies the physical object and the user addresses in reference to the received unique identifier and the association information stored in the storing section, and prompts the user to enter a conversational element, the conversational element relating to the physical object and to be provided to the user addresses;
　　a capture subsystem that captures the conversational element to be entered by the user; and
　　a communications subsystem that provides the conversational element captured by the capture subsystem to the plurality of user addresses relating to the physical object.

2. The communication system according to claim 1, wherein each said user address includes at least one of a telephone number, an email address, and an instant messaging address.

3. The communication system according to claim 1, wherein:
　　when the receive subsystem receives the unique identifier and the storing section has not already stored the unique identifier, the control section prompts the user to associate the unique identifier with the physical object, and with an address of the user as one of the user addresses, by use of the communications terminal.

4. The communication system according to claim 1, wherein:
　　when the receive subsystem receives the unique identifier and the storing section has not already stored the unique identifier, the control section prompts the user to enter object information relating to the physical object and an address of the user, and associates the unique identifier with the physical object, and with the address of the user as one of the user addresses, by use of the communications terminal.

5. The communication system according to claim 4, wherein the object information includes at least one of a title of the physical object and a name of the physical object.

6. The communication system according to claim 1, wherein:
　　when the receive subsystem receives the unique identifier and the storing section has been stored the unique identifier, the control section asks the user whether the user wants to be notified of a further conversational element about the physical object, and
　　when the user enter an affirmative answer indicating that the user wants to be notified of the further conversational element, the control section further prompts the user to enter an address of the user.

7. The communication system according to claim 1, wherein the fixation portion includes at least one of a push pin, a magnet, a staple and an adhesive material, which are configured to couple the posting device with the physical object.

8. The communication system according to claim 1, wherein:
　　the posting device further includes an activation button that activates the posting device, the activation button configured to be physically accessed by the user; and
　　the receive subsystem receives the unique identifier from the posting device when the user physically accesses the activation button.

9. The communication system according to claim 1, wherein the posting device is configured to transmit the unique identifier to the communications terminal when the user accesses the posting device.

10. The communication system according to claim 1, wherein the conversational element includes an audio message about the physical object, and wherein the capture subsystem is configured to capture the audio message.

11. The communication system according to claim 1, wherein the conversational element includes a text message about the physical object, and wherein the capture subsystem is configured to capture the text message.

12. The communication system according to claim 1, wherein:
　　the capture subsystem is configured to capture ancillary information about the physical object; and
　　the communications subsystem is configured to provide the ancillary information about the physical object to the user addresses relating to the physical object.

13. The communication system according to claim 12, wherein the ancillary information includes information generated by the physical object.

14. The communication system according to claim 12, wherein the ancillary information includes information generated by a processor associated with the physical object.

15. The communication system according to claim 12, wherein the ancillary information includes information generated by a sensor associated with the physical object.

16. A communications terminal, comprising:
　　a storing section that stores association information associating a unique identifier included in a posting device with a physical object, and with a plurality of user addresses relating to the physical object, the posting device including a fixation portion configured to physically couple the posting device with the physical object;
　　a receive subsystem that receives the unique identifier from the posting device when a user accesses the posting device;
　　a control section that identifies the physical object and the user addresses in reference to the received unique identifier and the association information stored in the storing section, and prompts the user to enter a conversational element, the conversational element relating to the physical object and to be provided to the user addresses; and
　　a capture subsystem that captures the conversational element to be entered by the user; and
　　a communications subsystem that provides the conversational element captured by the capture subsystem to the plurality of user addresses relating to the physical object.

17. The communications terminal according to claim 16, wherein each said user address includes at least one of a telephone number, an email address, and an instant messaging address.

18. The communications terminal according to claim 16, wherein:
　　when the receive subsystem receives the unique identifier and the storing section has not already stored the unique identifier, the control section prompts the user to associate the unique identifier with the physical object, and with an address of the user as one of the user addresses, by use of the communications terminal.

19. The communications terminal according to claim 16, wherein:

when the receive subsystem receives the unique identifier and the storing section has not already stored the unique identifier, the control section prompts the user to enter object information relating to the physical object and an address of the user, and associates the unique identifier with the physical object, and with address of the user as one of the user addresses, by use of the communications terminal.

20. The communications terminal according to claim 19, wherein the object information includes at least one of a title of physical object and a name of the physical object.

21. The communications terminal according to claim 16, wherein:

when the receive subsystem receives the unique identifier and the storing section has been stored the unique identifier, the control section asks the user whether the user wants to be notified of a further conversational element about the physical object, and when the user enter an affirmative answer indicating that the user wants to be notified of the further conversational element, the control section further prompts the user to enter an address of the user.

22. The communications terminal according to claim 16, wherein the conversational element includes an audio message about the physical object, and wherein the capture subsystem is configured to capture the audio message.

23. The communications terminal according to claim 16, wherein the conversational element includes a text message about the physical object, and wherein the capture subsystem is configured to capture the text message.

24. The communication terminal according to claim 16, wherein:

the capture subsystem is configured to capture ancillary information about the physical object; and the communications subsystem is configured to provide the ancillary information about the physical object to the user addresses relating to the physical object.

25. The communication terminal according to claim 23, wherein the ancillary information includes information generated by the physical object.

26. The communication terminal according to claim 23, wherein the ancillary information includes information generated by a processor associated with the physical object.

27. The communication terminal according to claim 23, wherein the ancillary information includes information generated by a sensor associated with the physical object.

28. The communication terminal according to claim 16, wherein each said user address includes at least one of a telephone number, and email address, and an instant message address.

29. A new communication method, comprising:

storing association information associating a unique identifier included in a posting device with a physical object, and with a plurality of user addresses relating to the physical object, the posting device including a fixation portion configured to physically couple the posting device with the physical object;

receiving the unique identifier from the posting device when a user accesses the posting device;

identifying the physical object and the user addresses in reference to the received unique identifier and the association information stored in the storing section;

prompting the user to enter a conversational element, the conversational element relating to the physical object and to be provided to the user addresses;

capturing the conversational element to be entered by the user; and providing the conversational element entered by the user to the plurality of user addresses relating to the physical object.

30. The communication method according to claim 29, wherein each said user address includes at least one of a telephone number, and email address, and an instant message address.

31. A computer readable medium storing a program causing a computer to execute a process for communication, the process comprising:

storing association information associating a unique identifier included in a posting device with a physical object, and with a plurality of user addresses relating to the physical object, the posting device including a fixation portion configured to physically couple the posting device with the physical object;

receiving the unique identifier from the posting device when a user accesses the posting device;

identifying the physical object and the user addresses in reference to the received unique identifier and the association information stored in the storing section, prompting the user to enter a conversational element, the conversational element relating to the physical object and to be provided to the user addresses; and capturing the conversational element to be entered by the user; and providing the conversational element entered by the user to the plurality of user addresses relating to the physical object.

32. The computer readable medium according to claim 31, wherein each said user address includes at least one of a telephone number, an email address, and an instant messaging address.

* * * * *